US008639202B2

(12) United States Patent
Oh et al.

(10) Patent No.: US 8,639,202 B2
(45) Date of Patent: Jan. 28, 2014

(54) DYNAMIC ALTERNATIVE FREQUENCY CHANNEL SWITCHING IN WIRELESS TERMINAL

(75) Inventors: Jong-Hwan Oh, Daegu (KR); Jun-Hyo Park, Gyeongsangbuk-do (KR); Hae-Min Park, Busan (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 85 days.

(21) Appl. No.: 13/409,563

(22) Filed: Mar. 1, 2012

(65) Prior Publication Data

US 2012/0264385 A1 Oct. 18, 2012

(30) Foreign Application Priority Data

Apr. 12, 2011 (KR) ........................ 10-2011-0033965

(51) Int. Cl.
*H04B 1/18* (2006.01)

(52) U.S. Cl.
USPC .................. 455/179.1; 455/185.1; 455/166.1; 455/184.1; 455/160.1; 455/161.3

(58) Field of Classification Search
USPC .......... 455/160.1, 161.3, 185.1, 179.1, 166.1, 455/184.1
See application file for complete search history.

(56) References Cited

U.S. PATENT DOCUMENTS

| | | | | |
|---|---|---|---|---|
| 7,756,464 | B2 * | 7/2010 | Uppala | 455/3.01 |
| 8,238,810 | B2 * | 8/2012 | Uppala | 455/3.01 |
| 8,463,216 | B2 * | 6/2013 | Thomas et al. | 455/166.1 |
| 2007/0129035 | A1 | 6/2007 | Olson et al. | |
| 2009/0247099 | A1 | 10/2009 | Jaisimha et al. | |
| 2011/0306313 | A1 * | 12/2011 | Jaisimha et al. | 455/185.1 |

FOREIGN PATENT DOCUMENTS

| | | | |
|---|---|---|---|
| EP | 1 195 897 | A2 | 4/2002 |
| EP | 1 865 608 | A1 | 12/2007 |
| JP | 2010-232831 | A | 10/2010 |
| KR | 10-0986981 | B1 | 10/2010 |

* cited by examiner

*Primary Examiner* — Junpeng Chen
(74) *Attorney, Agent, or Firm* — Cha & Reiter, LLC

(57) ABSTRACT

Provided is a device and method for providing an Alternative Frequency (AF) in a wireless terminal, by which an AF channel service suitable for a user environment can be provided. To this end, the device includes a radio broadcast receiver for receiving a radio broadcast signal, and a controller for attempting an AF channel switch after an elapse of a re-try wait time which is set according to a number of recent AF channel switch failures. The controller may detect the user environment as a walking state or a driving state. If a driving state is detected, the AF channel switch is attempted immediately when receive signal quality is below a threshold, regardless of the number of recent AF channel failures. If a walking state is detected, the AF channel switch is attempted after the elapse of the wait time.

20 Claims, 3 Drawing Sheets

DYNAMIC ALTERNATIVE FREQUENCY CHANNEL SWITCHING IN WIRELESS TERMINAL

CLAIM OF PRIORITY

This application claims the benefit under 35 U.S.C. §119 (a) of a Korean Patent Application filed in the Korean Intellectual Property Office on Apr. 12, 2011 and assigned Serial No. 10-2011-0033965, the entire disclosure of which is hereby incorporated by reference.

BACKGROUND OF THE INVENTION

1. Field of the Invention

The present invention relates to wireless terminals with radio reception capability.

2. Description of the Related Art

The Radio Data System (RDS) protocol includes information about Program Service (PS), Radio Text (RT) as additional data information for a channel provided by a broadcasting station, Alternative Frequency (AF), etc. Among these, the AF service provides a user with a frequency of another channel transmitting the same broadcast as that carried by a currently received channel when the reception state of the current channel is poor, thereby providing seamless radio service to the user.

The AF service checks the reception state of a currently used channel for a predetermined time, and if the state of the current channel is poor, the AF service searches an AF candidate channel list. If an AF candidate channel is the same broadcasting channel as the current channel, a switch over is made to the AF candidate channel, such that the AF service is completed.

To execute the AF service, first, a measurement for checking the reception state of the current channel is required. When the reception state of the current channel is inadequate for a predetermined time, that is, during a tolerance period, the AF candidate channel list is searched. The smaller the tolerance period, the more sensitive is the receiver to an instantaneous change of the reception state in a channel.

During a process of searching the AF candidate channel list, a radio mute condition inevitably occurs, such that muting more frequently occurs with a smaller tolerance period. In other words, as the AF service is provided with more sensitivity, the user experiences more instances of muting due to frequent AF attempts.

Generally, the AF service is a useful service for a user's driving conditions, but recently, the AF service has been needed also for walking conditions. In the context of driving, an RDS reception state is typically good and a channel reception state progressively changes, such that a relatively large tolerance period (e.g., 40-60 seconds) is used.

On the other hand, in the context of walking, an instantaneous electric field change frequently occurs, and in any given region, electric field conditions may be poor. As a result, in walking conditions, the use of a small tolerance period is required for sensitivity to the instantaneous electric field change. When the AF service is provided with high sensitivity, however, a side effect of frequent occurrence of muting is generated.

SUMMARY

An aspect of the present invention is to provide a wireless terminal and method therefor, capable of selecting an Alternative Frequency (AF), by which an AF channel service suitable for a user environment can be provided.

Another aspect of the present invention is to provide a wireless terminal and method therefor, capable of selecting an Alternative Frequency (AF), by which frequent occurrence of muting caused by an AF channel service can be minimized.

In an aspect, a wireless terminal includes a radio broadcast receiver for receiving a radio broadcast signal, and a controller. An AF channel switch is attempted by the controller when receive signal quality of the broadcast signal in a current channel is below a threshold. The AF channel switch is attempted after an elapse of a wait time which is set according to a number of recent AF channel switch failures In a further aspect, the controller detects a user environment as a walking state or a driving state. If a driving state is detected, the AF channel switch is attempted immediately when the receive signal quality is below the threshold, regardless of the number of recent AF channel failures. If a walking state is detected, the AF channel switch is attempted after the elapse of the wait time.

In another aspect, if the driving state is detected, the receive signal quality is measured over a first predetermined time duration designated for the driving state, and if the walking state is detected, the receive signal quality is measured over a second predetermined time duration designated for the walking state, where the second time duration is shorter than the first time duration.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. It should be noted that like symbols indicate like components throughout the drawings.

Figure 1:
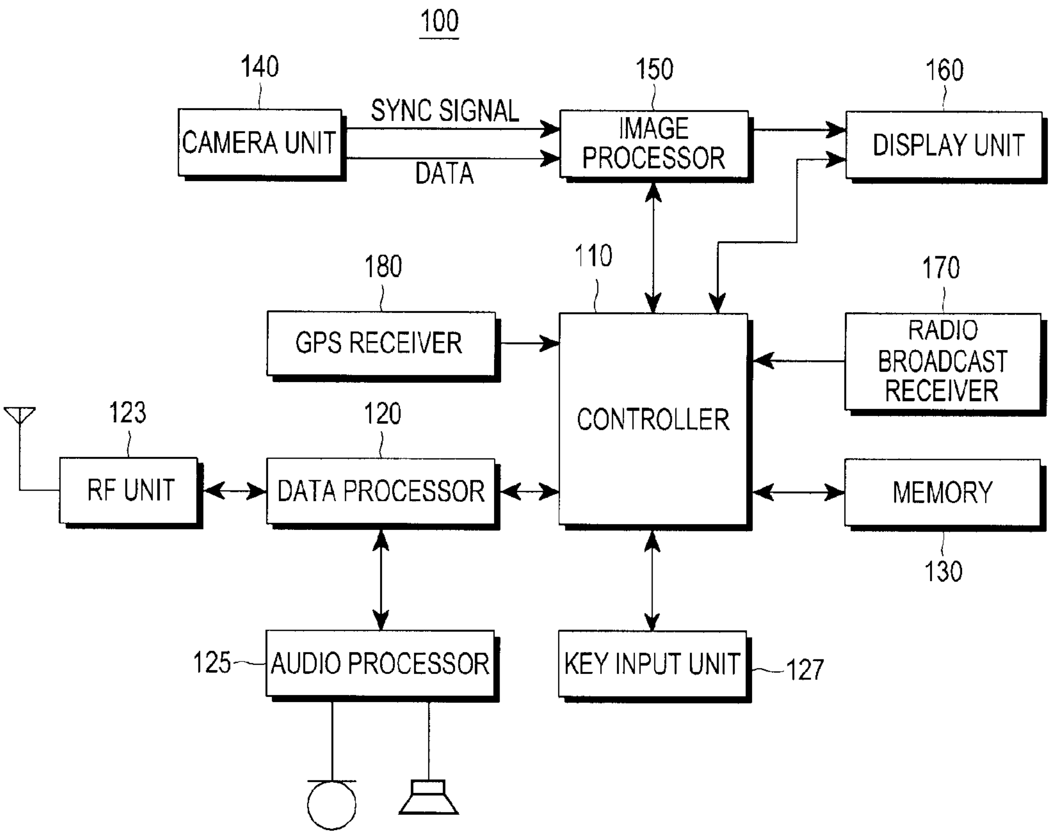
FIG. 1 is a block diagram of a wireless terminal according to an embodiment of the present invention.

FIG. 1 is a block diagram of a wireless terminal, 100, according to an exemplary embodiment of the present invention. As will be explained in detail hereafter, wireless terminal 100 is equipped with a radio broadcast receiver 170 for receiving radio broadcast signals, and a controller 110 for controlling the overall operation of the wireless terminal 100. When the receive signal quality of the broadcast signal is below a threshold, controller 110 controls an attempt at an AF channel switch. If the user environment is determined to be a driving state, the AF channel switch is attempted immediately. If the user environment is determined as a walking state, the AF channel switch is attempted: immediately if no recent AF channel switch failures have occurred; or, if recent AF channel switch failures have occurred, after an elapse of a wait time which is set according to the number or recent AF channel switch failures. The wait time can be set progressively longer as the number of AF channel switch failures increases. In this manner, the frequency of mute periods, which occur during AF channel switch attempts, is reduced, thereby reducing inconvenience to the user. Referring still to FIG. 1, a Radio Frequency (RF) unit 123 which performs a wireless communication function of the wireless terminal 100. The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. Thus the data processor 120 may include a modem and a codec. Here, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions. The key input unit may embodied with physical keys and/or virtual keys on a touch screen.

A memory 130 includes program and data memories. The program memory stores programs for controlling a general operation of the wireless terminal. The program memory may also provide at least one program for providing an Alternative Frequency (AF) channel switching process according to a type of user environment. In an embodiment, the at least one program may determine if the user environment is a walking or driving environment, monitor recent AF channel switch failures in the walking environment, and set re-try wait times for AF channel switch re-attempts in accordance with the number of recent AF channel switch failures. This process will be explained in detail below.

The memory 130 may also store an AF channel list for determining the effectiveness of an AF channel list included in Radio Data System (RDS) information transmitted from a broadcasting station according to an embodiment of the present invention.

In an embodiment, the controller 110 determines a type of a user environment when receiving a radio broadcast signal through a current channel.

To this end, the controller 110 may measure a speed of the wireless terminal through location information of a wireless terminal, which is received through a Global Positioning System (GPS) receiver 180, and determine from the measured speed whether the type of the user environment is a walking state or a driving state.

In an embodiment, when the type of the user environment is a walking state, the controller 110 determines that the receive signal quality is below a threshold level and an AF channel switch may be attempted if a Received Signal Strength Indicator (RSSI) and a Signal to Noise Ratio (SNR) of the current channel received over a predetermined time period designated for the walking state are less than respective threshold values.

In an embodiment, when the type of the user environment is a driving state, the controller 110 attempts AF channel switch if the RSSI and the SNR of the current channel received over a predetermined time designated for the driving state are less than respective threshold values. The predetermined time designated for the driving state is preferably longer than that designated for the walking state.

A radio broadcast receiver 170 receives and demodulates a radio broadcast signal from sky waves.

The GPS receiver 180 measures location information of the wireless terminal and transmits the measured location information to the controller 110.

A camera unit 140 captures an image, and may include a camera sensor for converting an optical signal of the captured image into an electrical signal, and a signal processor for converting an analog image signal of the image captured by the camera sensor into digital data. Here, the camera sensor may be a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one integrated component or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

Figure 2A:
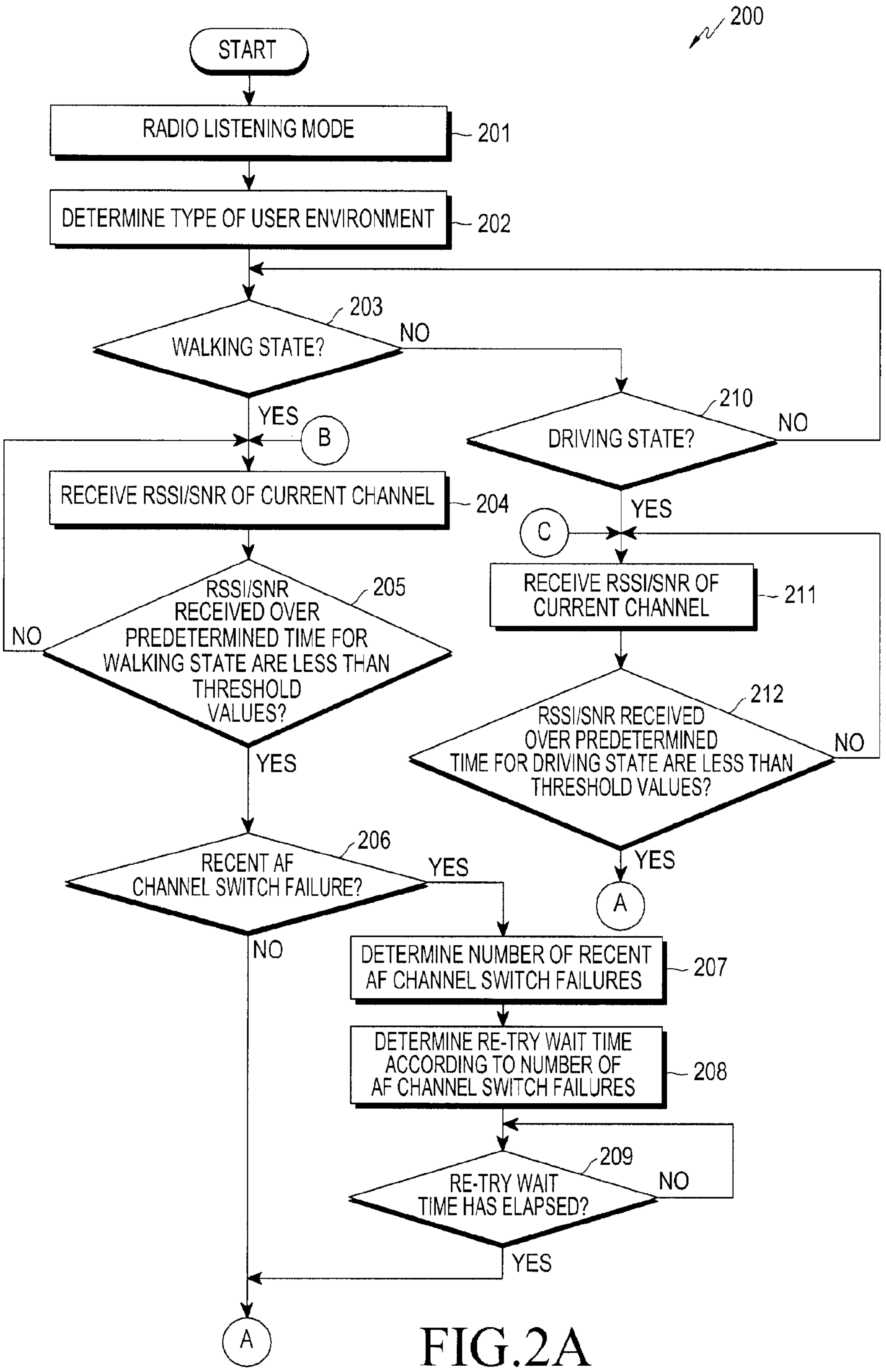
FIGS. 2A and 2B are flowcharts illustrating a process of selecting an Alternative Frequency (AF) channel in a wireless terminal according to an embodiment of the present invention.
Figure 2B:
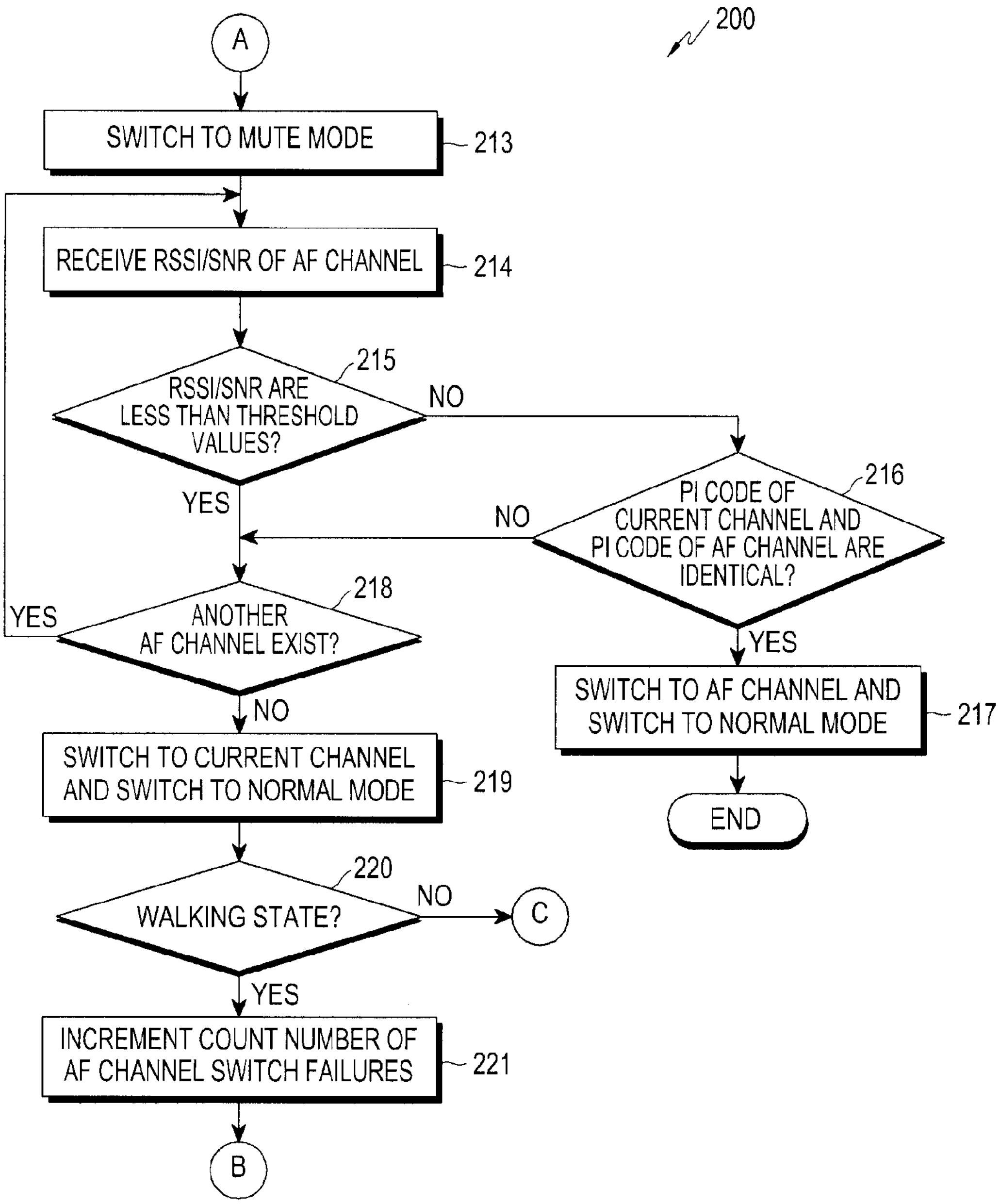

FIGS. 2A and 2B are flowcharts illustrating a process, 200, of selecting an AF channel in a wireless terminal according to an embodiment of the present invention.

Referring to FIGS. 2A and 2B in conjunction with FIG. 1, in step 201 the wireless terminal 100 is in a radio listening mode; the controller 110 then proceeds to step 202 to determine a type of a user environment.

In step 202, the controller 110 measures a current speed of wireless terminal 100 through location information of the wireless terminal 100, which is received through the GPS receiver 180, and determines from the speed of wireless terminal 100 measured for a predetermined time whether the type of the user environment is a walking state or a driving state.

For example, if the speed of wireless terminal 100 measured for 30 seconds is lower than 15 km/h, the controller 110 may determine that the type of the current user environment is the walking state; if the wireless terminal's speed measured for 30 seconds is greater than 15 km/h, the controller 110 may determine that the type of the current user environment is the driving state. It is understood that other speeds and measurement duration times are entirely possible for this purpose.

If the controller 110 determines that the type of the user environment is the walking state in step 202, the controller 110 senses the determination in step 203, and receives an RSSI and an SNR of the current channel through which a radio broadcast is received by the radio broadcast receiver 170 in step 204.

In the present embodiment, by recognizing the reception state of the current channel from the SNR as well as the RSSI, a more reliable measurement can be made with respect to the reception state of the current channel.

In step 205, the controller 110 compares the RSSI and the SNR of the current channel, which have been received over a predetermined time for the walking state, with predetermined threshold values to determine whether the receive signal quality of the broadcast has fallen below a quality threshold, necessitating an AF channel switch attempt.

The predetermined time for the walking state may be, e.g. 1-3 seconds, taking account of the walking state which may have frequent instantaneous electric field changes and poor electric field conditions in a particular region.

If the RSSI and the SNR of the current channel are less than the threshold values as a result of the comparison, the controller 110 senses the result in step 205. The flow then proceeds to step 206, where the controller determines whether a recent AF channel switch failure has occurred. If not, the flow proceeds to step 213 et seq. in which an AF channel switch attempt is made (discussed below).

If in step 206 it is determined that at least one AF channel switch failure has recently occurred, controller 110 next determines in step 207 how many such failures have recently occurred (i.e., the number of recent AF channel switch failures). Based on this number, a re-try wait time is determined in step 208. That is, the controller 110 does not attempt an AF channel switch for the re-try wait time set in step 208 according to the number of AF channel switch failures.

Preferably, the re-try wait time progressively increases as the number of failures rises. With this approach, less re-tries are made in an environment of high channel switch failure, thereby reducing mute periods which occur during the AF channel switch attempts. For example, if the number of AF channel switch failures is 1, the AF channel switch may not be attempted for 5 seconds (re-try wait time=5 seconds); if the number of AF channel switch failures is 2, AF channel switch may not be attempted for 5+30=35 seconds. Many other examples are possible. A time added according to the number of AF channel switch failures is preferably automatically computed; however, it could be manually adjustable as well.

After an elapse of the re-try wait time, the controller 110 senses the elapse in step 209 and thereafter proceeds to perform the AF channel switch attempt process, beginning in step 213.

As such, if the type of the user environment is the walking state, as the number of AF channel switch failures increases, the re-try wait time which is set according to the number of AF channel switch failures, increases. The re-try wait time is a standby time without an attempt at AF channel switch, so as this time increases, the frequency occurrence of mute is reduced, thereby solving the excessive muting problem which occurs in conventional systems.

With regard to the driving state: if determining that the type of the user environment is the driving state in step 202, the controller 110 senses the determination in step 210, and receives the RSSI and the SNR of the current channel through which radio broadcast is received by the radio broadcast receiver 170 in step 211.

In the present embodiment, by recognizing the reception state of the current channel from the SNR as well as the RSSI, a more reliable measurement can be made with respect to the reception state of the current channel.

The controller 110 compares the RSSI and the SNR of the current channel, which have been received over a predetermined time duration designated for the driving state, with predetermined threshold values.

Since the driving state may have a good RDS reception state and a progressively changing channel reception state, the predetermined time for the driving state may be, e.g., 40-60 seconds which is larger than the predetermined time for the walking state.

If the RSSI and the SNR of the current channel are less than the threshold values as a result of the comparison, the controller 110 senses the result and performs the AF channel switch attempt process, in step 212. Thus in the driving state, the AF channel switch attempt process is begun immediately, i.e., without determining if recent AF channel switch failures have occurred.

In the AF channel switch attempt process, the controller 110 compares a previously stored AF channel list corresponding to a current location with an AF channel list received through the RDS information. If the two AF channel lists are identical as a result of comparison, the controller 110 determines that the received AF channel list is an effective AF channel list and switches the radio listening mode to a mute mode, in step 213, in order to perform the AF channel switch attempt.

With conventional techniques, since the AF channel list is transmitted through the RDS information received from the broadcasting station, regardless of the effectiveness of the AF channel, AF channel switch is attempted in spite of the received AF channel list being ineffective, causing unnecessary occurrence of mute.

Therefore, in an embodiment of the present invention, the controller 110 pre-stores an AF channel list corresponding to the current location, which is received from a server for providing an AF channel list, in the memory 130 of the wireless terminal. In this manner, the effectiveness of the AF channel list included in the RDS information received from the broadcasting station is first determined, and then an AF channel switch is attempted.

In step 214, the controller 110, after switching the radio listening mode to the mute mode, checks the AF channel list received through the RDS information, receives an RSSI and an SNR of a predetermined AF channel included in the AF channel list, and compares the RSSI and the SNR of the AF channel with predetermined threshold values Next, in step 215, if the RSSI and the SNR of the AF channel are greater than the threshold values as a result of comparison, the controller 110 senses the result and compares a Program Identification (PI) code of the current channel and a PI code of the AF channel, in step 216. If the current channel's PI code and the AF channel's PI code are identical, the controller 110 senses the result in step 216, switches the current channel to the AF channel and switches the current mute mode to a normal mode in step 217.

However, if the current channel's PI code and the AF channel's PI code are not identical, the flow proceeds to step 218 where the controller 110 senses the result and determines whether there are another available AF channel exists in the AF channel list. If so, the controller 110 temporarily switches the receiver turning to the next candidate AF channel and repeats step 214 through 217 for that AF channel.

If in step 215 the RSSI and the SNR of the AF channel are less than the threshold values as a result of comparison, the flow proceeds to step 218 where the controller 110 senses the result and determines whether there another available AF channel exists in the AF channel list. If so, the controller 110 temporarily switches the receiver tuning to the next candidate AF channel and repeats steps 214 through 217 for that AF channel.

However, if in step 218 it is determined that no further AF channel exists in the candidate AF channel list, the controller 110 senses the determination in step 218 and proceeds to step 219 to switch the AF channel to the current channel and switch the current mute mode to the normal mode.

Thus, considering steps 214, 215 and 218: these steps constitute a sub-process in which an overall AF channel switch failure is determined to occur if a sequence of AF channel switch attempts at all available AF channels allocated for the current channel have failed. If no more candidate AF channels exist to try in step 218, the flow proceeds to step 219 where a switch is made back to the current channel, even though it has already been determined that the current channel is receiving poor signal quality. (As an alternative, if any of the AF channels are measured to have signal quality superior to the current channel, the best AF channel can be used in step 219 instead of the current channel.)

In step 219 where the AF channel is switched to the current channel and the mute mode is switched to the normal mode, if determining that the type of the current user environment is the walking state, the controller 110 senses the determination in step 220, and increments a count of the number of AF channel switch failures and stores the count in the memory 130 in step 221. This number is then used as the current number for recent AF channel switch failures in a subsequent determination of a re-try wait time in step 207, i.e., in the event that a return to step 204 will again flow to step 207. However, when returning to step 204 following step 221, if the current channel conditions have improved resulting in a NO determination in step 205, the current number is then reset to zero (in a step not shown).

In an embodiment variation, instead of considering the sequence of attempting all allocated AF channels of steps 214, 215 and 218 as a single AF channel attempt, each attempt at a candidate AF in step 215 can be considered an individual attempt to be counted in step 221.

As is apparent from the foregoing description, by providing the wireless terminal and method for selecting an AF in the wireless terminal, an AF channel service suitable for a user environment can be provided, and frequency occurrence of mute caused by the AF channel service can be minimized.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While detailed embodiments have been described in the present disclosure, various changes may be made without departing from the scope of the present invention. Accordingly, the scope of the present invention should be defined by the claims and equivalents thereof, rather than the described embodiments.

What is claimed is:

1. A wireless terminal comprising:

a radio broadcast receiver for receiving a radio broadcast signal; and a controller configured to attempt an Alternative Frequency (AF) channel switch when receive signal quality of the broadcast signal in a current channel is below a threshold, wherein the AF channel switch is attempted after an elapse of a wait time which is set according to a number of recent AF channel switch failures, such that the wait time of AF channel switch failures, which is set after the receive signal quality is determined, is set longer than the wait time of at least one of a recent AF channel switch failures.

2. The wireless terminal of claim 1, wherein the controller determines a type of a user environment during reception of the radio broadcast signal, and if the type of the user environment is a walking state, the controller determines that receive signal quality is below a threshold if a Received Signal Strength Indicator (RSSI) and a Signal to Noise Ratio (SNR) of the current channel received over a predetermined time duration designated for the walking state are less than predetermined threshold values.

3. The wireless terminal of claim 2, wherein the controller measures a speed of the wireless terminal through location information of the wireless terminal, which is received through a Global Positioning System (GPS) receiver, and determines from the measured speed that the type of the user environment is the walking state.

4. The wireless terminal of claim 1, wherein, if the number of recent AF channel switch failures is zero, the wait time is zero such that an AF channel switch attempt is immediately made; and if the number of recent AF channel switch failures is one or more, the wait time is set progressively longer as the number of failures increases.

5. The wireless terminal of claim 1, wherein:

the controller detects a user environment as a walking state or a driving state;

if a driving state is detected, the AF channel switch is attempted immediately when the receive signal quality is below the threshold, regardless of the number of recent AF channel failures; and if a walking state is detected, the AF channel switch is attempted after the elapse of the wait time set according to a number of recent AF channel switch failures.

6. The wireless terminal of claim 5, wherein if the driving state is detected, the receive signal quality is measured over a first predetermined time duration designated for the driving state, and if the walking state is detected, the receive signal quality is measured over a second predetermined time duration designated for the walking state, the second time duration being shorter than the first time duration.

7. The wireless terminal of claim 1, wherein an AF channel switch failure is determined to occur if a sequence of AF channel switch attempts at all available AF channels allocated for the current channel have failed.

8. The wireless terminal of claim 1, wherein the controller determines the type of the user environment during reception of the radio broadcast signal, and if the type of the user environment is a driving state, the controller attempts AF channel switch immediately if an RSSI and an SNR of the current channel received during a predetermined time duration designated for the driving state are less than predetermined threshold values.

9. The wireless terminal of claim 8, wherein the controller measures a speed of the wireless terminal through location information of the wireless terminal, which is received through the GPS receiver, and determines from the measured speed that the type of the user environment is the driving state.

10. The wireless terminal of claim 1, wherein the AF channel switch is only attempted if an AF channel list previously stored in the wireless terminal and an AF channel list received from a broadcasting station are identical.

11. A method for selecting an Alternative Frequency (AF) in a wireless terminal, the method comprising:

receiving a radio broadcast signal in a current channel; and attempting an AF channel switch when receive signal quality of the current channel is determined to be below a threshold, the AF channel switch being attempted after an elapse of a wait time which is set according to a number of recent AF channel switch failures, such that the wait time of AF channel switch failures, which is set after the receive signal quality is determined, is set longer than the wait time of at least one of a recent AF channel switch failures.

12. The method of claim 11, wherein the attempting of AF channel switch comprises:

determining a type of a user environment during reception of the radio broadcast signal;

if the type of the user environment is a walking state, the receive signal quality is determined to be below a threshold by comparing a Received Signal Strength Indicator (RSSI) and a Signal to Noise Ratio (SNR) of the current channel received over a predetermined time duration designated for the walking state with predetermined threshold values;

if the RSSI and the SNR of the current channel received during the predetermined time for the walking state are less than the predetermined threshold values, determining that AF channel switch is requested;

if AF channel switch is requested, determining whether the number of recent AF channel switch failures is at least one;

if the number of AF channel switch failures is at least one, setting the wait time according to the number of AF channel switch failures; and attempting no AF channel switch until an elapse of the wait time which is set according to the number of AF channel switch failures.

13. The method of claim 12, further comprising:

if the number of AF channel switch failures is zero, immediately attempting an AF channel switch.

14. The method of claim 12, further comprising:

if AF channel switch fails during an attempt at AF channel switch after the elapse of the time which is set according to the number of AF channel switch failures, incrementing a count of the number of AF channel switch failures.

15. The method of claim 12, further comprising:

after the elapse of the wait time, comparing an AF channel list previously stored in the wireless terminal with an AF channel list received from a broadcasting station; and if the previously stored AF channel list and the received AF channel list are identical, attempting AF channel switch.

16. The method of claim 12, further comprising:

if the type of the user environment is a driving state, comparing an RSSI and an SNR of the current channel received over a predetermined time designated for the driving state with predetermined threshold values; and if the RSSI and the SNR of the channel received during the predetermined time designated for the driving state are less than the predetermined threshold values, attempting AF channel switch.

17. The method of claim 16, wherein the attempting of AF channel switch comprises:

if the RSSI and the SNR of the current channel are less than the predetermined threshold values, comparing an AF channel list previously stored in the wireless terminal with an AF channel list received from a broadcasting station; and if the previously stored AF channel list and the received AF channel list are identical, attempting AF channel switch.

18. The method of claim 12, wherein the determining of the type of the user environment comprises:

measuring a speed of the wireless terminal through location information of the wireless terminal, which is received through a Global Positioning System (GPS) receiver; and determining from the measured speed whether the type of the user environment is the walking state or the driving state.

19. A tangible data storage medium comprising executable data capable of causing a programmable device in a wireless terminal that receives a current broadcast signal to perform the steps of:

attempting an AF channel switch when receive signal quality of a current channel of the broadcast signal is determined to be below a threshold, the AF channel switch being attempted after an elapse of a wait time which is set according to a number of recent AF channel switch failures, such that the wait time of AF channel switch failures, which is set after the receive signal quality is determined, is set longer than the wait time of at least one of a recent AF channel switch failures.

20. The data storage medium of claim 19, wherein the programmable device further performs the steps of:

detecting a user environment as a walking state or a driving state;

if a driving state is detected, attempting the AF channel switch immediately when the receive signal quality is below the threshold, regardless of the number of recent AF channel failures; and if a walking state is detected, attempting the AF channel switch after the elapse of the wait time set according to a number of recent AF channel switch failures.

* * * * *